United States Patent [19]

Kaczur et al.

[11] Patent Number: 5,328,673
[45] Date of Patent: Jul. 12, 1994

[54] PROCESS FOR REMOVAL OF $NO_x$ AND $SO_x$ OXIDES FROM WASTE GASES WITH CHLORIC ACID

[75] Inventors: Jerry J. Kaczur, Cleveland, Tenn.; Steven A. Iacoviello, Naugatuck, Conn.; Budd L. Duncan, Athens, Tenn.

[73] Assignee: Olin Corporation, Stamford, Conn.

[21] Appl. No.: 980,075

[22] Filed: Nov. 23, 1992

[51] Int. Cl.[5] .................. C01B 21/00; C01B 17/00
[52] U.S. Cl. ................... 423/235; 423/243.01; 423/243.08
[58] Field of Search ............ 423/237, 238, 243.01, 423/243.08, 235, 235 D

[56] References Cited

U.S. PATENT DOCUMENTS

| | | | |
|---|---|---|---|
| 4,451,442 | 5/1984 | Jeffrey et al. | 423/224 |
| 4,619,608 | 10/1986 | McIntyre et al. | 423/243.01 |
| 4,968,501 | 11/1990 | Mason | 423/243 |
| 5,084,148 | 1/1992 | Kaczur et al. | 204/95 |

FOREIGN PATENT DOCUMENTS

| | | | |
|---|---|---|---|
| 51-011066 | 1/1976 | Japan . | |
| 51-020772 | 2/1976 | Japan . | |
| 51-039570 | 4/1976 | Japan . | |
| 51-095977 | 8/1976 | Japan . | |
| 53-39021 | 10/1978 | Japan | 423/243.08 |
| 53-113761 | 10/1978 | Japan . | |
| 58-150415 | 9/1983 | Japan | 423/243.08 |
| 169012 | 6/1990 | Japan . | |
| 886954 | 7/1981 | U.S.S.R. | 423/243.01 |

Primary Examiner—Gregory A. Heller
Attorney, Agent, or Firm—William A. Simons; F. A. Iskander

[57] ABSTRACT

A process for removing $NO_x$ oxides and $SO_x$ oxides from gaseous streams contacts the gaseous stream with an aqueous solution of chloric acid. The process of the invention removes sulfur oxides and nitrogen oxides from waste gas streams without producing inorganic salts. In addition, the use of chloric acid provides improved oxidation of NO and $SO_2$. The process can be operated to treat "dirty" gas streams containing particulates and compounds which may poison or contaminate $NO_x$ removal systems employing catalysts.

17 Claims, 1 Drawing Sheet

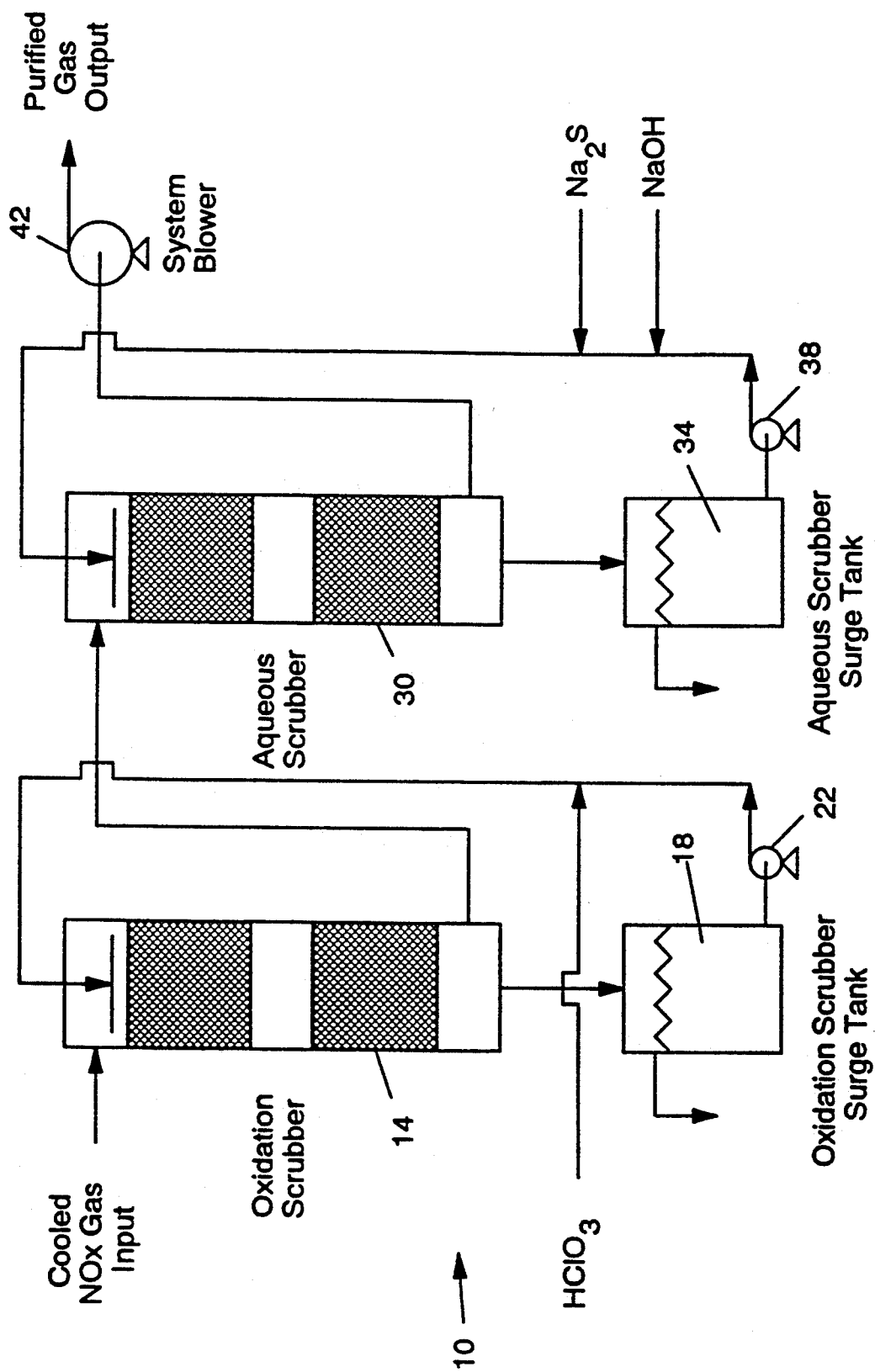

PROCESS FOR REMOVAL OF $NO_x$ AND $SO_x$ OXIDES FROM WASTE GASES WITH CHLORIC ACID

BACKGROUND OF THE INVENTION

1. Field of the Invention

The present invention relates to the treatment of waste gases generally and, more particularly, to a novel process for the removal of nitrogen oxides and sulfur oxides from such gases using chloric acid as an oxidizer.

2. Background Art

The amount of $NO_x$ and $SO_x$ in gases released, for example, from chemical operations, manufacturing facilities and power plants is limited by environmental air discharge permits issued by local, state, federal and regulatory agencies worldwide. Air discharge permits, in many locations in the United States, are being reviewed and revised to include all of the $NO_x$ and $SO_x$ gaseous species emitted. In many cases, the allowable $NO_x$ gas discharge in a waste gas stream can be limited to concentrations as low as about 10 to 1.00 ppm in the output gas stream.

The $NO_x$ or gaseous nitrogen oxides in waste gases are generally composed of a mixture of NO, $NO_2$, $N_2O_3$, $N_2O_4$, and $N_2O_5$. As the gas phase generally contains water vapor, oxyacids such as $HNO_2$ and $HNO_3$ can also be present in the $NO_x$ gas stream. In addition, there are processes which can generate significant amounts of $N_2O$ (nitrous oxide). Except for NO, nitric oxide, most of the other nitrogen oxides can be easily removed or scrubbed from the waste gas using suitable concentrations of alkaline solutions such as dilute NaOH, carbonates, or those containing aqueous sulfur-based reducing compounds such as sodium sulfide ($Na_2S$).

The removal of $NO_x$ by scrubbing is particularly a problem when the waste gas contains substantial quantities of NO in the $NO_x$ gas stream. In this case, NO must be oxidized to $NO_2$ prior to removal by conventional scrubbing using water or alkaline chemical solutions.

The deleterious effects of sulfur oxides ($SO_x$) include the formation of acid rain ($H_2SO_4$) by the reaction of sulfur oxides with atmospheric moisture. Acid rain has a pH of 2 or less and is responsible for acidifying streams and lakes. In addition, the presence of gaseous sulfur oxides may contribute to respiratory problems, to reduced atmospheric visibility, and to corrosion of materials.

Various oxidizing agents have been used in processes for removing $NO_x$ and $SO_x$ oxides from gaseous streams. Sodium chlorite and dilute solutions of chlorine dioxide ($ClO_2$) have been found to be very efficient in NO oxidation. Sodium hypochlorite, potassium permanganate, hydrogen peroxide, and other peroxyacid based oxidizers are significantly less efficient in NO oxidation. Ozone ($O_3$) is an effficient NO oxidation agent, but it is expensive to generate.

The use of chlorous acid for the removal of sulfur dioxide from combustion gases has been described in U.S. Pat. No. 4,968,501, issued Nov. 6, 1990 to J. A. Mason. The chlorous acid is formed by reacting a solution of sodium chlorite with an organic acid such as lactic, citric, malic, tartaric or glycolic acids. The chlorous acid is further reacted to form chlorine dioxide which reacts with the $SO_2$ present in the gas stream. Chloric acid is produced as an undesirable by-product during the formation of the chlorous acid.

A $SO_x$ and $NO_x$-containing waste gas is oxidized with an oxidizing solution containing $KClO_3$ or $NaClO_3$ to oxidize NO to $NO_2$, then the treated gas is scrubbed with an alkaline absorbent to absorb $NO_x$ and $SO_x$ (Japanese patent no. 76-95977, issued Aug. 23, 1976 to T. Matsuda et al. Chem. Abstracts 87(4):28282p).

Japanese Patent Office, Patent Disclosure No. 74-113,598, published Apr. 2, 1976 by A. Kita, describes a process for removing nitrogen oxide from waste gases by contacting the gas with an aqueous solution containing an alkali metal or alkaline earth metal chlorate and an alkali metal or alkaline earth metal chloride. The NO is almost completely oxidized to $NO_2$, after which the gas is treated with a conventional denitrating agent i.e., $Na_2SO_3$ (Chem. Abstracts 85(24): 181722k).

Hydrogen sulfide in fluid streams is removed upon contact with a substantially neutral aqueous stream containing a polyvalent metal chelate. An oxidizing agent is used to oxidize elemental sulfur to soluble sulfur compounds with $SO_2$ being preferred. Other oxidizing agents which can be used include the alkali metal salts of inorganic oxidizing agents such as perchloric, chloric, hypochlorous and permanganic acids. (U.S. Pat. No. 4,451,442, issued May 29, 1984 to G. C. Jeffrey et al).

Y. Yamashita et al teach a process for the removal of $NO_x$ from waste gases using an aqueous solution of $ClO_2$ (pH 5-8) in the first scrubber followed by a second scrubber containing $Na_2S$. (Kyowa Chem. Indus. Japanese Patent Office, Patent Disclosure No. 1990-169012, Jun. 29, 1990).

Mixtures of alkali metal chlorates or alkaline earth metal chlorates with sulfuric acid have been used to remove $NO_x$ and $SO_x$ oxides from a waste gas (boiler flue gas, combustion gas). The gas is contacted with a solution containing Na or Ca chlorate, $H_2SO_4$ and a ferrous salt to oxidize NO to $NO_2$. The solution amy also contain HCl or a chloride which produces HCl. (Sumitomo Chemical Co. Japan. Publn. 51-20772 Feb. 19, 1976). Similarly, a $SO_x$ and NOx-contg. flue gas is oxidized with a solution containing K or Na chlorate and $H_2SO_4$ to oxidize NO to $NO_2$. The treated gas is then contacted with a red mud slurry obtained during alumina production. (Sumitomo Chemical Co. Japan. Publn. 53-113761, Oct. 4, 1978). However, the Applicants have found that the presence of sulfate ions in the chlorate-$H_2SO_4$ mixture hinders or reduces the oxidation of NO gas resulting in lower NO gas removal efficiency.

There is need for a process of removing $NO_x$ and $SO_x$ oxides from gaseous streams which does not result in the formation of liquid effluents containing salts of inorganic acids. Further, there is need for an improved process of oxidizing NO and $SO_2$ present in gaseous waste streams.

SUMMARY OF THE INVENTION

Accordingly, it is an object of the invention to provide a process for the removal of sulfur oxides and nitrogen oxides from waste gas streams without producing inorganic salts.

Another object of the invention is to provide such a process having improved oxidation of NO and $SO_2$.

A further object of the invention is to provide a process that can be operated treating "dirty" gas streams containing particulates and compounds which may poison or contaminate $NO_x$ removal systems employing catalysts.

These and other objects of the invention are accomplished in a process for removing $NO_x$ oxides and $SO_x$ oxides from gaseous streams comprising contacting the gaseous stream with an aqueous solution consisting essentially of chloric acid.

BRIEF DESCRIPTION OF THE DRAWING

Understanding of the present invention and the various aspects thereof will be facilitated by reference to the accompanying FIGURE, submitted for purposes of illustration only and not intended to limit the scope of the invention.

The FIGURE schematically illustrates a system for conducting the process of the present invention.

DETAILED DESCRIPTION OF THE DRAWING

The FIGURE illustrates a system for conducting the process of the present invention, generally indicated by the reference numeral 10, for purifying waste gases containing $NO_x$ oxides and $SO_x$ oxides.

System 10 includes oxidation scrubber 14, having oxidation scrubber surge tank 18 connected to the base thereof and having a recirculation pump 22 to recirculate liquid from oxidation scrubber surge tank 18 to the upper part of oxidation scrubber 14.

System 10 also includes an aqueous scrubber 30, having a surge tank 34 connected to the base thereof and having a recirculation pump 38 to recirculate liquid to the upper part of aqueous scrubber 30. A system blower 42, connected to aqueous scrubber 30, draws gas through system 10 and outputs purified gas therefrom.

In operation, waste gas containing, for example, nitrogen oxides is fed to the upper part of oxidation scrubber 14. An aqueous solution containing chloric acid is also fed to the upper part of oxidation scrubber 14 by means of circulating pump 22. If necessary, means (not shown) may be provided for cooling the waste gas stream to a suitable temperature. In oxidation scrubber 14 the waste gas containing nitrogen oxides contacts the aqueous solution containing chloric acid and nitrogen oxides such as NO are oxidized. In the lower part of the column., the liquid/gas mixture is separated and the liquid flows to oxidation scrubber surge tank 18.

Gas from the lower part of oxidation scrubber 14 is fed to the upper part of aqueous scrubber 30. The gas contacts an aqueous solution, containing, for example, water or aqueous solutions containing sodium sulfide and sodium hydroxide, to neutralize acidic components and to remove $NO_2$ and other nitrogen oxide species from the gas stream. The purified gas stream is separated from the liquid in the lower part of aqueous scrubber 30 and is removed from aqueous scrubber 30 by means of system blower 42.

Alternatively, scrubbers 14 and 30 can be individually operated in a counter-current mode with the waste gas entering the lower part of oxidation scrubber 14. Also alternatively, scrubbers 14 and 30 may be operated with the injection of single-pass liquid solutions.

The acidic solution recovered from oxidation scrubber 14 can be further processed for the recovery/recycle of the acids produced by the scrubbing process. Such processing may include distillation or other physical methods of separating and/or purifying the acids. Alternatively, the acidic solution recovered from oxidation scrubber 14 can be used to neutralize the effluent from aqueous scrubber 30.

The oxidation scrubber 14 may be operated at any suitable temperature, for example, at from about 0° C. to about 100° C., with a preferred temperature operating range of from about 5° C. to about 90° C., and more preferably from about 20° C. to about 80° C. Aqueous scrubber 30 may be operated at temperatures in these same ranges. Any suitable heating or cooling means may be used to maintain temperatures in oxidation scrubber 14 and aqueous scrubber 30.

DETAILED DESCRIPTION OF THE PREFERRED EMBODIMENTS

The novel process of the invention employs as the oxidizing agent an aqueous solution of chloric acid, $HClO_3$, which is substantially free of anionic and cationic impurities. Recently it has been discovered that highly pure chloric acid can be produced by the direct oxidation of an aqueous solution of hypochlorous acid having very low concentrations of chloride ions and dissolved chlorine and free of other anionic or cationic impurities. Suitable processes for the production of the chloric acid solutions used in the process of the invention are described in U.S. Pat. No. 5,089,095, issued Feb. 18, 1992 to D. W. Cawlfield et al. In one process an aqueous solution of hypochlorous acid is heated at a temperature in the range of 25° to 120° C. and a solution of chloric acid produced. Alternatively, an aqueous solution of hypochlorous acid is fed to the anode compartment of an electrolytic cell having an anode compartment, a cathode compartment, and an ion exchange membrane separating the anode compartment from the cathode compartment. The hypochlorous acid solution is electrolyzed in the anode compartment during a residence time of less than about 8 hours to produce a solution of chloric acid of high purity. Where desired, the chloric acid solution may be concentrated by heating the solution at a temperature above about 40° C.

In practising the process of the invention, gases containing $NO_x$ oxides and/or $SO_x$ oxides and mixtures thereof are contacted with the chloric acid solutions of high purity to oxidize any oxidizable species of $NO_x$ oxides and/or $SO_x$ oxides present in the gas. The concentration of the chloric acid is not critical and any suitable concentration may be used. For example, the chloric acid feed concentration range may be from about 0.05 wt. % to about 50 wt. %, with a preferred concentration range of from about 1.0 wt. % to about 40 wt. %, and a more preferred range of from about 5 wt. % to about 35 wt. %.

Where the gas to be purified contains $NO_x$ oxides including NO, aqueous chloric acid solutions have been found to be efficient in oxidizing NO with an added feature that the reaction chemistry produces gaseous chlorine dioxide ($ClO_2$) as one of the by-products. The by-product gaseous $ClO_2$ further reacts to oxidize NO to $NO_x$ and nitric acid. Thus the process provides both direct oxidation by chloric acid and secondary oxidation by the chlorine dioxide produced as a by-product of the reaction.

Without being limited hereby, it is believed that the reaction of chloric acid ($HClO_3$) with nitric oxide (NO) in the $NO_x$ containing gas is represented by the following equation:

$$NO + 2HClO_3 \rightarrow NO_2 + 2ClO_2 + H_2O \qquad (1)$$

In this reaction, NO is a reducing agent which reacts with the chloric acid to form $ClO_2$. The net reactions of ClO₂ gas with nitric oxide (NO) and nitrogen dioxide (NO₂) are believed to be represented by the following equations:

$$(2)\ 5NO + 2ClO_2 + H_2O \longrightarrow 2HCl + 5NO_2$$

$$(3)\ 5NO_2 + ClO_2 + 3H_2O \longrightarrow HCl + 5HNO_3$$

Net: $(4)\ 5NO + 3ClO_2 + 4H_2O \longrightarrow 3HCl + 5HNO_3$

Reaction (2) shows that one mole of ClO₂ is capable of oxidizing 2.5 moles of NO to NO₂ (molar reaction ratio of NO to C1O2 is 2.5:1). The NO₂ can be further oxidized to HNO₃ as in reaction 3, with one mole of ClO₂ being capable of oxidizing 5 moles of NO₂. The actual net stoichiometry depends on the contact times and concentrations of the NO$_x$ species and chloric acid in the scrubber, The combination of reactions (1) and (2) is believed to be represented by the net reaction equation (5) as follows:

$$6NO + 2HClO_3 \rightarrow 2HCl + 6NO_2 \quad (5)$$

The reaction of equation (5) shows a 3:1 NO:HClO₃ molar reaction ratio in oxidizing NO to NO₂.

Where the chloric acid oxidizer and its byproduct ClO₂ are totally reduced in the oxidation of NO and NO₂, the net oxidation result, based on equations (1) and (4) is believed to be represented by equation (6) as follows:

$$13NO + 6HClO_3 + 5H_2O \rightarrow 3NO_2 + 6HCl + 10HNO_3 \quad (6)$$

This is a 2.27:1 NO:HClO₃ molar reaction ratio with some NO₂ residual in the byproduct gas.

In purifying SO$_x$ oxide-containing gases in which SO₂ is the major component, the SO₂ oxidation chemistry is believed to be represented by the following equations:

$$(7)\ SO_2 + 2HClO_3 \longrightarrow 2ClO + H_2SO_4$$

$$(8)\ 5SO_2 + 2ClO_2 + 6H_2O \longrightarrow 5H_2SO_4 + 2HCl$$

Net: $(9)\ 6SO_2 + 2HClO_3 + 6H_2O \longrightarrow 6H_2SO_4 + 2HCl$

Net reaction equation (9) shows that there is a 3:1 SO2:HClO2 molar reaction ratio in the oxidation of SO₂ to H2SO4.

The oxidation scrubber liquor containing chloric acid maybe treated with a reducing agent to generate chlorine dioxide. The reducing agent is preferably one which does not introduce "persistent anions" into the solution. Suitable inorganic reducing agents are selected from the group of peroxides such as hydrogen peroxide and alkali metal peroxides such as sodium peroxide and potassium peroxide. Organic reducing agents are selected from the group of alcohols such as methanol, ethanol, propanol, isopropanol, and higher molecular weight linear and branched alcohols. Other suitable organic reducing agents are selected from the group of carbohydrate sugars such as glucose, sucrose, maltose, and others.

In an alternate embodiment, a mixture of chloric acid and an alkali metal chlorate may be used as the oxidizing agent. The mixtures of chloric acid and alkali metal chlorate are preferably produced in a process described in U.S. Pat. No. 5,084,148, issued Jan. 28, 1992 to J. J. Kaczur et al. An aqueous solution of chloric acid—alkali metal chlorate substantially free of anionic and cationic impurities is prepared electrolytically in an electrolytic cell having an anode compartment and a cathode compartment. At least one ion exchange compartment separates the anode compartment from the cathode compartment. The ion exchange compartment includes a flow channel for the aqueous alkali metal chlorate solution between two cation permeable ion exchange membranes. Suitable alkali metal chlorates include sodium chlorate, potassium chlorate and lithium chlorate, with sodium chlorate being preferred. The alkali metal chlorate solution fed to the ion exchange compartment may be prepared, for example, by dissolving a crystalline alkali metal chlorate, such as sodium chlorate, in pure or deionized water. Commercial sodium chlorate is suitable as it is generally substantially free of significant amounts of sulfate,-chloride, hypochlorite, and phosphate ions as anionic impurities. For example, the sulfate content of the chlorate feed solution is preferably less than about 1 wt %. When chloride ion is present in the sodium chlorate feed solution, chlorine dioxide may be spontaneously formed in the ion exchange compartments of the electrolytic cell. When present, chlorine dioxide migrates through the membrane into the cathode compartment. In the cathode compartment, chlorine dioxide can disproportionate into chloride and chlorate ions which are undesired impurities in, for example, the alkali metal hydroxide solution produced as the catholyte. The chloride ion content of the aqueous solution of sodium chlorate should be less than about 1.0 wt % and preferably less than about 0.1 wt %. Cationic impurities to be avoided include transition metal ions, such as those of iron, nickel, chromium and vanadium.

Aqueous sodium chlorate feed solutions which may be employed contain any suitable concentrations up to about saturation at the temperatures at which the solutions are fed to the ion exchange compartment of the electrolytic cell. Thus sodium chlorate solutions having a concentration in the range of from about 0.1% by weight to those saturated with sodium chlorate at temperatures in the range from about 0° C. to about 100° C., and preferably from about 15° C. to about 80° C., may be employed. These sodium chlorate solutions have a concentration in the range from about 0.1% by weight to about 60% by weight of NaClO₃, preferably from about 20% to about 55%, and more preferably from about 30% to about 50% by weight of NaClO₃.

The anode compartment contains an anolyte, which initially can be an aqueous solution of, for example, sulfuric acid. The hydrogen ions generated in the anode compartment during electrolysis pass through the cation exchange membrane separating the anode compartment from the ion exchange compartment. As a hydrogen ion enters the sodium chlorate solution in the ion exchange compartment, a sodium ion is displaced and by electrical ion mass action passes through the cation membrane adjacent to the cathode compartment to maintain electrical neutrality. The sodium ion displacement results in the conred, sion of sodium chlorate to chloride acid over a wide range, for example, from about 1% to about 99.9%, preferably from about 5% to about 95%, and more preferably from about 15% to about 90%.

The sodium chlorate feed solution concentration, the residence time in the ion exchange compartment and the anode compartment, as well as the cell amperage are factors that affect the extent of the conversion of sodium chlorate to chloric acid.

The catholyte produced in the cathode compartment can be any suitable aqueous solution, including alkali metal chlorides, and acids such as hydrochloric, sulfuric, phosphoric, nitric, acetic or others. Preferably deionized or softened water or alkali metal hydroxide solution is used as the catholyte in the cathode compartment to produce an alkali metal hydroxide solution.

Following the oxidation of oxidizable species of $NO_x$ oxides and $SO_x$ oxides in the chloric acid solution, the treated gas is separated from a solution of chloric acid containing acidic components such as nitric acid and sulfuric acid. The treated gas is then fed to an aqueous scrubber. Suitable solutions for the aqueous scrubber include water, water soluble and water suspensions of sulfur-based reducing agents including alkali metal or alkaline earth sulfides and hydrosulfides with sodium sulfide, sodium hydrosulfide, and calcium sulfide being examples. Other sulfur-based reducing agents are sulfites, bisulfites, hydrosulfites and thiosulfates. The selection of the sulfur based reducing agent is generally based on chemical cost.

Alternate choices of aqueous scrubber liquors are alkali metal or alkaline earth metal hydroxides including sodium hydroxide and calcium hydroxide. Alkaline solutions of alkali metal and alkaline earth metal carbonates could also be used in the aqueous scrubber. These alkaline solutions can be readily prepared in electrolytic processes for producing chloric acid or mixtures of chloric acid and alkali metal chlorates.

Following aqueous scrubbing the purified gas, now substantially free of $NO_x$ oxides and $SO_x$ oxides, can be utilized or discharged without further treatment.

Chloric acid solutions or mixtures of chloric acid and alkali metal chlorates can also be used in the scrubbing/oxidizing of other oxidizable gases such as $H_2S$ present as an impurity in natural gas, as well as mercaptans and other sulfur-based gases found, for example, in air. Suitable oxidation or aqueous scrubbers include packed columns using plastic or ceramic Raschig rings, saddles, balls, and the like. Also suitable are scrubbers which employ packings in the form of porous metal or plastic pads. In addition, other scrubber designs such as spray compacting and Venturi-type scrubbers may also be employed. The plastics and metals used need to be resistant to chloric acid as well as nitric, sulfuric, and hydrochloric acids produced in the oxidation scrubber. Suitable resistant plastics are chlorine and fluorine based types such as polytetrafluorethylene, polyvinyl chloride, and polyvinylidene difluoride. Metals include the group of valve metals as well as high alloy type stainless steel such as the nickel-chromium based types such as Hastelloy C, Hastelloy 276, and the like. Scrubber selection can be determined by known engineering design methods based on the $NO_x$ waste gas stream flowrate, $NO_x$ concentration, and pressure drop requirements for the system.

All patent applications, patents and other documents cited herein are incorporated in their entirety by reference hereinto.

To further illustrate the invention the following examples are provided without any intention of being limited thereby. All parts and percentages are by weight unless otherwise specified.

EXAMPLE

A set of two 500 ml gas scrubber bottles with coarse glass frits were arranged in series flow. The first scrubber was filled with 500 ml of a pure chloric acid solution containing 5.0% by wt. of $HClO_3$. The second scrubber was empty and employed as a collector to prevent liquid from entering the gas analyzer. An EXTREL ® Corporation Questor Process Analyzer V 3.06 mass spectrometer was connected to the scrubbers. A gas containing 803 ppm of NO in argon, from a compressed gas cylinder, was metered into the first scrubber at a rate of about 500 ml/min. All solutions and gases were used at ambient temperature. The intensities of the various mass weight gaseous species detected from 12 to 100 atomic mass units were measured for the NO-containing gas before and after passing through the oxidizing scrubber containing chloric acid. After being scrubbed with the chloric acid solution, 94.5–95.4% of the NO had been removed from the gas.

COMPARATIVE EXAMPLE

The method of the Example was reproduced exactly with the exception that the first scrubber bottle was filled with 500 ml of a solution of 6.38 wt % sodium chlorate, $NaClO_3$, in 10 wt % sulfuric acid, $H_2SO_4$. After being scrubbed with the sodium chlorate - sulfuric acid solution, 85.4–87.2% of the NO had been removed from the gas.

The Example illustrates the significantly improved oxidation of NO achieved by use of the process of the invention employing chloric acid over that of the prior art practise of using mixtures of sodium chlorate and sulfuric acid. This significant improvement is believed to be attributed to the absence of ions, such as sulfate ions, which appear to hinder the oxidation of NO.

What is claimed is:

1. A process for removing either $NO_X$ oxides, or $SO_X$ oxides or mixtures thereof from a gaseous stream comprising:
   (a) contacting a gaseous stream containing either $NO_X$ oxides, or $SO_X$ oxides or mixtures thereof in an oxidizing scrubber with an aqueous oxidation solution consisting essentially of chloric acid or a mixture of chloric acid and alkali metal chlorate at about 0° C. to about 100° C. for sufficient time to oxidize any oxidizable species of said $NO_X$ oxides and $SO_X$ oxides, said chloric acid feed concentration being from about 0.05% to about 50% by weight of said aqueous oxidization solution and said aqueous oxidation solution being substantially free of other cationic and anionic impurities;
   (b) separating said oxidized gaseous stream from said aqueous oxidation solution which contains nitric acid, sulfuric acid or mixtures thereof found from said oxidation of said oxidizable $NO_X$ and $SO_X$ oxides;
   (c) contacting said oxidized gaseous stream in an aqueous scrubber with an aqueous solution selected from the group consisting of water, an aqueous solution of an alkaline compound or an aqueous solution of a sulfur-based reducing agent for sufficient time to remove substantially all of the $NO_X$ oxides, $SO_X$ oxides or mixtures thereof from said oxidized gaseous stream; and
   (d) separating said oxidized gaseous stream which is substantially free of said $NO_X$ oxides, $SO_X$ oxides or mixtures thereof from said aqueous solution.

2. The process of claim 1 wherein said gaseous stream contains $NO_X$ oxides.

3. The process of claim 1 wherein said gaseous stream contains $SO_X$ oxides.

4. The process of claim 1 wherein said gaseous stream contains a mixture of $NO_X$ oxides and $SO_X$ oxides.

5. The process of claim 1 wherein said aqueous oxidation solution consists essentially of chloric acid.

6. The process of claim 1 wherein said aqueous oxidation solution consists essentially of a mixture of chloric acid and an alkali metal chlorate.

7. The process of claim 6 wherein said alkali metal chlorate is sodium chlorate.

8. The process of claim 1 wherein said temperature in step (a) is from about 5° C. to about 80° C.

9. The process of claim 1 wherein said chloric acid feed concentration is from about 1.0% by weight to 40% by weight of said aqueous oxidation solution.

10. The process of claim 1 wherein said aqueous oxidation solution additionally contains a reducing agent selected from the group consisting of hydrogen peroxide, alkali metal peroxides, alcohols and carbohydrate sugars.

11. The process of claim 1 wherein said aqueous solution in step (c) is water.

12. The process of claim 1 wherein said aqueous solution in step (c) is an aqueous solution of an alkaline compound selected from the group consisting of an alkali metal hydroxide, an alkaline earth metal hydroxide, an alkali metal carbonate, an alkali earth metal carbonate, and mixtures thereof.

13. The process of claim 12 wherein said aqueous solution in step (c) is an aqueous solution of sodium hydroxide or calcium hydroxide.

14. The process of claim 1 wherein said aqueous solution in step (c) is a sulfur-based reducing agent.

15. The process of claim 14 wherein said aqueous solution in step (c) is an aqueous solution of a sulfur-based reducing agent selected from the group consisting of alkali metal sulfides, alkaline earth sulfides, hydrosulfides, sulfites, bisulfites, hydrosulfites and thiosulfates.

16. The process of claim 1 wherein the acid values in said separated aqueous oxidation solution produced by step (b) are recovered.

17. The process of claim 1 wherein the separated aqueous oxidation solution produced by step (b) is used to neutralize the separated aqueous solution produced by step (d).

* * * * *